April 23, 1957  G. J. ZAHRADNIK ET AL  2,789,674
SELF-ENGAGING CLUTCH
Filed July 21, 1954
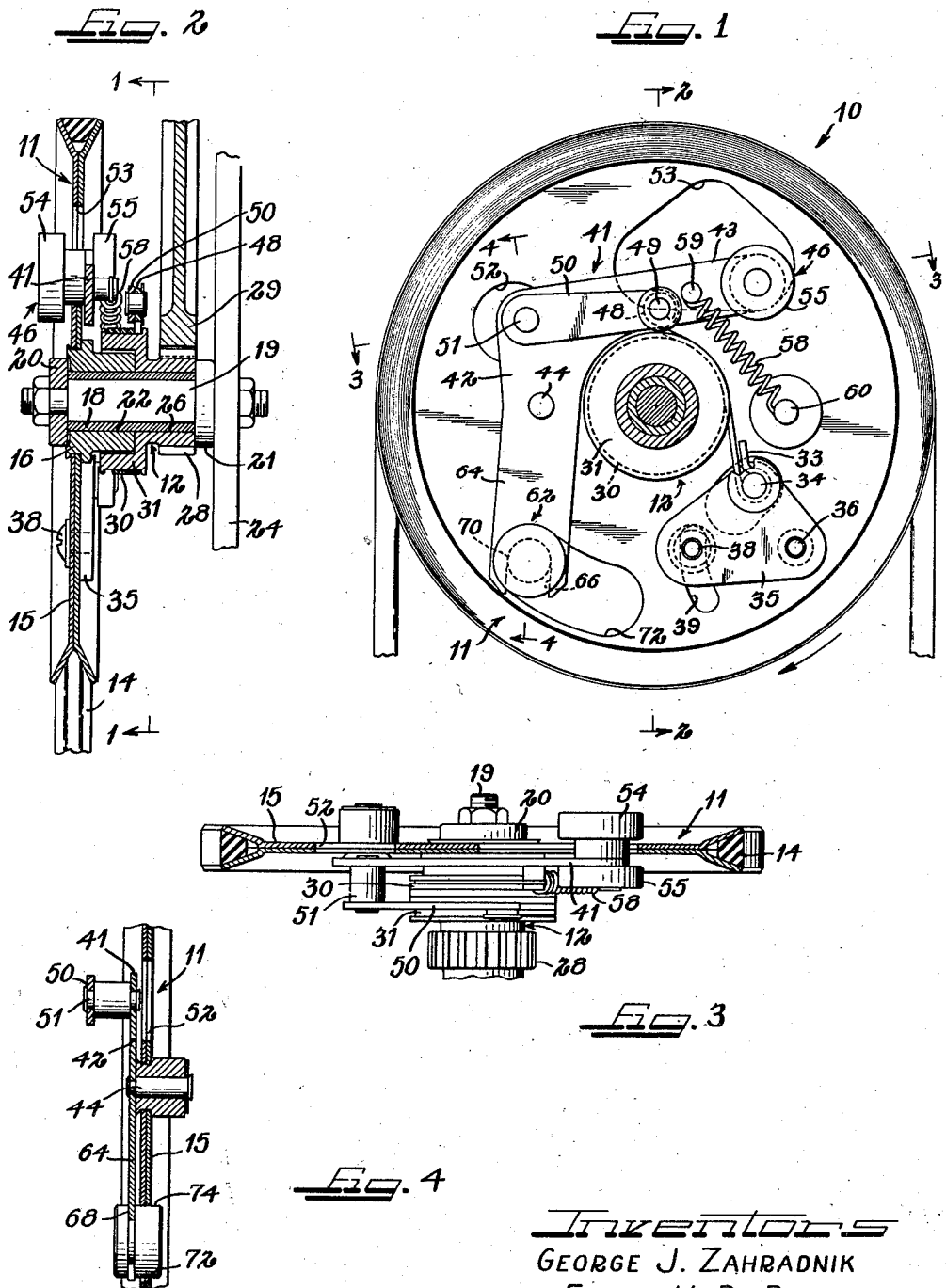
Inventors
GEORGE J. ZAHRADNIK
EDGAR H. DU BOIS
Ooms, McDougall, Williams & Hersh
Attys.

United States Patent Office 2,789,674
Patented Apr. 23, 1957

2,789,674

SELF-ENGAGING CLUTCH

George J. Zahradnik, North Riverside, and Edgar H. Du Bois, Chicago, Ill., assignors to A. B. Dick Company, Chicago, Ill., a corporation of Illinois Application July 21, 1954, Serial No. 444,758

5 Claims. (Cl. 192—105)

This invention relates to clutches and particularly to an improved self-actuating clutch which engages automatically when one element of the clutch is set into rotation.

One principal object of the invention is to provide an improved self-actuating clutch which engages and releases smoothly and with a minimum of shock.

Another object is to provide an improved clutch operable in response to a combination of acceleration and rotary speed.

It is a further object to provide an improved clutch which is operated both by inertia and by centrifugal action.

Further objects and advantages of the invention will appear from the following description, taken with the accompanying drawing, in which:

Figure 1 is an elevational view of an illustrative clutch embodying the invention, the view being partly in section along a line 1—1 in Fig. 2;

Fig. 2 is a sectional view of the clutch taken generally along a line 2—2 in Fig. 1;

Fig. 3 is a sectional view taken generally along a line 3—3 in Fig. 1; and

Fig. 4 is a fragmentary sectional view taken generally along a line 4—4 in Fig. 1.

Considered in greater detail, the drawing shows a purely illustrative embodiment of the invention in the form of a self-engaging drive clutch 10 adapted to establish a driving connection between a pair of rotary elements when one of the elements is set into rotation, while leaving the elements unconnected when they are stationary. Clutches of this type find many applications. For example, they are often employed to couple an electric drive motor to a duplicating machine or the like, in order to reduce the starting torque required of the motor. When a self-actuating clutch is employed, the drive motor starts without any load and picks up the load as its speed increases to the normal operating value.

In this instance, the self-actuating clutch 10 comprises a pair of rotatable elements 11 and 12 which may be termed the driving and the driven elements, respectively. The driving element 11 takes the form of a V-flanged pulley adapted to be driven in a clockwise direction (Fig. 1) by means of a V-belt 14 connected to a pulley on a drive motor (not shown). While the details of the pulley 11 are purely illustrative, it will be observed that the pulley has a disk-like radial web or central plate 15 mounted on a hub 16. Rotary support for the hub 16 is provided by a bushing 18 mounted on a post 19 between retaining washers 20 and 21. A bore 22 is formed in the hub to receive the bushing 18. The mounting post 19 may be secured to a frame plate 24 which may constitute part of a duplicating machine, for example.

In this instance, the driven member 12 is sleeve-like in form and is provided with a bore 26 rotatably mounted on the bushing 18. At its right-hand end, the illustrated driven member 12 is formed into a pinion 28 adapted to mesh with a gear 29 which may be connected to the main cylinder (not shown) of the duplicating machine.

In order to form a driving connection between the driving and driven elements 11 and 12, the clutch 10 is provided with an elongated flexible element 30 in the form of a wire or band coiled helically around a drum 31 formed on the driven element 12. To provide for adjustment of the initial tension or tightness of the coiled band 30, an eye or loop 33 formed at one end of the band is connected to a pivot 34 mounted on an anchoring plate 35. A pivot 36 is provided for swingably mounting the plate 35 on the disk-like web 15 of the pulley 11. It will be understood that the plate 35 may be swung to various positions to adjust the initial tightness of the band 30 about the drum 31. The adjustment of the plate 35 may be maintained by tightening a clamping screw 38 which extends through an arcuate slot 39 in the pulley 11 and is threaded into the plate 35.

As the pulley 11 is brought up to speed, the clutch 10 is engaged by means of an actuating arm 41 which serves to tighten the band 30 about the drum 31 so that the band will form a frictional driving connection between the pulley and the driven element 12. In this instance, the arm 41 is generally L-shaped and is formed with angularly related portions 42 and 43 which, in this instance, meet approximately at right angles. It will be observed that the arm 41 is oriented so that the axis of the driving member 11 is inside the included angle between the portions 42 and 43. To provide pivotal support for the arm 41, the portion 42 is fitted with a pivot 44 mounted on the web 15 of the pulley 11.

A massive element or weight 46 is mounted or formed on the free end of the portion 43 in order that the arm 41 may be actuated by inertia and centrifugal force. The arm 41 extends generally along the arc of a circle centered about the axis of the pulley with the result that the massive element 46 is spaced angularly to a considerable extent from the pivot 44, about the axis of the pulley. This angular spacing between the massive element and the pivot is in a clockwise direction from the pivot or, in other words, in the direction in which the pulley 11 is intended to be rotated.

In order to connect the arm 41 to the band 30, the free or unanchored end of the band is formed into an eye or loop 48 and is connected to a pivot 49 mounted on one end of a link 50. The other end of the link 50 is fitted with a pivot 51 connected to the arm 41 at the point where the portions 42 and 43 join, the link 50 thus being attached to the arm at a point intermediate its ends.

A cutout 52 may be formed in the web 15 of the pulley 11 to provide clearance for the pivot 51. Likewise, a slot or cutout 53 may be formed in the web 15 to provide for free movement of the massive element 46, which is shown in the form of a pair of disk-like weights 54 and 55, secured to opposite sides of the actuating arm 41 and disposed on opposite sides of the web 15. A coiled tension spring 58 is stretched between anchoring pins 59 and 60, mounted on the arm 41 and the web 15, respectively, to bias the arm 41 inwardly against the hub 16 of the pulley 11. It will be observed that the band 30 is coiled about the drum 31 in a clockwise direction between the arm 41 and the anchoring plate 35. Thus, the direction of coiling of the band 30 is the same as the intended direction of operation on the pulley 11.

To prevent gravity from interfering with the disengaging action of the clutch 10, the actuating arm 41 is provided with a counterbalancing weight 62 (Figs. 1 and 4). The arrangement of this weight 62 is such that it counterbalances the effect of gravity on the main actuating weight 46 but does not nullify the action of centrifugal force on the main weight. Moreover, the counterbalancing weight 62 is so arranged that the effect of inertia on the weight 62 supplements the action of inertia on the main weight 46. By thus accentuating the action of inertia, the counterbalancing weight 62 improves the engaging as well as the disengaging action of the clutch.

To support the counterbalancing weight 62, the arm 41 is provided with a portion 64 extending from the pivot 44 in a direction opposite from the arm portion 42. Thus, the weight 62 is on the opposite side of the pivot from the main weight 46 with the result that the action of gravity on the weight 62 tends to neutralize or nullify the action of gravity on the main weight 46.

To prevent centrifugal action from throwing the weight 62 outwardly and thereby tending to neutralize the effect of centrifugal force on the main weight 46, a lost motion connection is provided between the weight 62 and the arm 41, and guide means are provided to constrain the weight 62 to follow an arcuate path centered about the axis of the driving and driven members 11 and 12. In this instance, the lost motion connection between the arm portion 64 and the weight 62 comprises a guide slot 66 formed in the end of the arm portion 64. It will be seen that the slot 66 extends approximately radially from the pivot 44. To engage the slot 66 the weight 62 is formed with a groove 68 defining a reduced or necked down portion 70 which is slidable along the slot 66. The weight 62 is guided along an arcuate path centered about the axis of rotation of the clutch members 11 and 12 by means of an arcuate slot 72 formed in the web or supporting plate 15 of the driving member 11. The weight 62 has an end portion 74 which is movable along the slot 72. It will be observed that the slot 66 in the arm extends in a direction transverse to the general direction of the slot 72.

In operation, the pulley 11 is brought up to its normal speed by means of the drive motor or other device (not shown) connected to the belt 14. The acceleration involved in bringing the pulley 11 up to speed tends to throw the main weight or massive element 46 tangentially, in a direction opposite to the direction of rotation, due to the inertia of the massive element. In other words, the massive element 46 tends to lag behind the pulley 11 and, hence, tends to shift counterclockwise relative to the pulley when the latter is accelerated in a clockwise direction. Due to the relation between the massive element 46 and the pivot 44, this counterclockwise shifting of the massive element throws the arm 41 outwardly, and, hence, tightens the band 30 about the drum 31. It will thus be apparent that the action of inertia on the main weight 46 tends to engage the clutch 10. Moreover, the action of inertia on the counterbalancing weight 62 is such as to reinforce the action of inertia on the main weight 46. When the driving member 11 is accelerated in a clockwise direction, the counterbalancing weight 62 tends to shift counterclockwise relative to the driving member. As a result, the weight 62 exerts a counterclockwise torque on the actuating arm 41. This torque is in a direction to reinforce the torque provided by the action of inertia on the main weight 46.

As the pulley picks up speed, centrifugal force on the main weight 46 supplements the action of inertia in throwing the arm 41 counterclockwise. At a predetermined stage in the operation of bringing the pulley up to speed, the combination of inertia and centrifugal force tightens the band 30 to such an extent that it grips the drum 31 and establishes a driving connection between the pulley 11 and the drum. Actually, the engagement of the band 30 with the drum 31 is gradual. Initially, there is slipping between the band and the drum until the band has been fully tightened. It has been found in actual practice that the engagement of the clutch 10 is smooth and practically shock free. There is no substantial jerking or chattering of the clutch. The clutch engages fully at a comparatively low speed, well below its normal operating speed.

It will be understood that centrifugal force tends to throw the counterbalancing weight 62 outwardly away from the axis of the driving member 11. However, the arcuate slot 72, being centered about the axis, prevents such outward movement of the weight 62. Accordingly, centrifugal force merely holds the weight 62 against the outer edge of the slot 72 but is entirely ineffective to throw the weight outwardly so as to nullify the action of centrifugal force on the main weight 46. As the actuating arm 41 swings counterclockwise, the weight 62 merely rolls or slides along the slots 72 and 66.

The smoothness of the engagement of the clutch is attributable in large part to the fact that it is operated by inertia in combination with centrifugal force. It has been found in actual practice that utilization of both inertia and centrifugal action to engage the clutch results in a marked improvement over employment of centrifugal action alone for this purpose. In actual experience with clutches operated by centrifugal force alone, it has been found that the clutches tend to engage rather abruptly at a definite operating speed. Such abrupt engagement produces a noticeable jerk and substantial shock to the rotating parts. When the clutch is arranged as shown, on the other hand, with the actuating arm 41 extending in the direction of normal operation between the pivot 44 and the main weight 46, and with the band 30 coiled in the normal direction of operation between the arm 41 and the anchoring plate 35, the inertia of the main weight 46 tends to engage the clutch progressively and gradually, beginning with a low speed of operation and continuing until the clutch has been fully engaged by centrifugal action. The action of inertia on the counterbalancing weight 62 also tends to engage the clutch, with the result that the weight 62 contributes to the smoothness of the engaging action.

When the drive motor utilized to drive the element 11 is de-energized or the driving element 11 is stopped, the action of inertia on the weights 46 and 62 tends to swing the arm 41 clockwise and thus disengage the clutch 10. As centrifugal force on the weight 46 decreases with the decreasing speed of the driving element 11, the spring 58 also tends to swing the arm 41 clockwise. These factors combine to bring about smooth disengagement of the clutch. Were it not for the counterbalancing weight 62, the action of gravity on the main weight 46 would tend to oscillate the arm 41 as the driving element coasts to a stop. In fact, it has been found in actual practice that the action of gravity on the main weight 46 is sufficiently pronounced, in the absence of the counterbalancing weight 62, to cause one or more cycles of alternate engagement and disengagement before the clutch is fully disengaged and brought to a halt. Such oscillation of the arm 41 and cyclical engagement and disengagement of the clutch are minimized and largely prevented by the counterbalancing weight 62. Since the weight 62 is on the opposite side of the pivot 44 from the main weight 46, the action of gravity on the main weight 46 tends to be nullified by the gravitational action on the counterbalancing weight 62. Gravity tends to move the weight 62 along the arcuate guide slot 72 with the result that the reduced portion 70 of the weight 62 has a camming action on the slot 62 formed in the arm 41. It will be recognized that the counterbalancing action of the weight 62 takes place during the acceleration, as well as the deceleration, of the driving element 11, and that the weight 62 thereby tends to improve the engaging action as well as the disengaging action of the clutch.

Various modifications, alternative constructions and equivalents may be employed without departing from the true spirit and scope of the invention as exemplified in the foregoing description and defined in the following claims.

We claim:
1. A self-engaging clutch comprising driving and driven members, means supporting said members in adjacent relation for independent rotation about a common axis, a clutch element operable to form a driving connection between said members, an actuating arm, a pivot swingably mounting said arm on said driving member, said arm having a first portion extending from said pivot in one angular direction about said axis of said driving member, an actuating weight mounted on said first arm portion, means connecting said clutch element to said first arm portion at a point thereon spaced in said one direction from said pivot so that accelerative rotation of said driving member in said one direction throws said first arm portion outwardly due to both inertia and centrifugal action and thereby tends to operate said clutch element to establish a driving connection between said driving and driven members, said arm having a second portion extending from said pivot toward a point on the opposite side of said common axis from said actuating weight, a counterbalancing weight connected to said second arm portion, a guiding member on said driving member having an arcuate guide slot therein centered about said axis and receiving said counterbalancing weight for preventing outward movement thereof due to centrifugal force while providing for movement of said counterbalancing weight along said slot due to the action of gravity, said second arm portion having a connection slot therein extending generally radially from said pivot, said counterbalancing weight having an element received in said connection slot to form a lost motion connection with said arm so that said counterbalancing weight neutralizes the action of gravity on said actuating weight.

2. A self-engaging clutch, comprising driving and driven members, means supporting said members in adjacent relation for independent rotation about a common axis, a clutch element operable to form a driving connection between said members, an actuating arm connected to said clutch element, a pivot swingably mounting said arm on said driving member, said arm having first and second portions extending from said pivot toward diametrically opposite points with respect to said axis of said members, an actuating weight secured to said first arm portion and arranged to swing outwardly by centrifugal action and thereby engage said clutch element, a counterbalancing weight connected to said second arm portion, guiding means on said driving member constraining said counterbalancing weight to follow an arcuate path centered about the axis of rotation of said driving element and thereby preventing outward movement of said counterbalancing weight under the action of centrifugal force, and means forming a lost motion connection between said counterbalancing weight and said second arm portion for transmitting gravity induced forces from said counterbalancing weight to said arm and thereby neutralizing the effect of gravity on said actuating weight.

3. A self-engaging clutch, comprising driving and driven members, means supporting said members in adjacent relation for independent rotation about a common axis, a clutch element operable to form a driving connection between said members, an actuating arm connected to said clutch element, a pivot for swingably mounting said arm on said driving member, said arm having first and second portions extending from said pivot toward points on opposite sides of said common axis of rotation, said first arm portion having actuating weight means fixed thereon to operate said clutch element by centrifugal action, a counterbalancing weight connected to said second arm portion, means supporting said counterbalancing weight for movement along an arcuate path centered about the axis of rotation of said driving element while preventing outward movement of said counterbalancing weight under the action of centrifugal force, and means for transmitting gravity induced forces from said counterbalancing weight to said second arm portion and thereby neutralizing the effect of gravity on said actuating weight means.

4. A self-engaging clutch, comprising driving and driven members, means supporting said members in adjacent relation for independent rotation about a common axis, a clutch element operable to form a driving connection between said members, an actuating arm connected to said clutch element, a pivot for swingably mounting said arm on said driving member, said arm having first and second portions extending from said pivot toward points on opposite sides of said common axis, actuating weight means on said first arm portion for operating said clutch element by centrifugal action, a counterbalancing weight connected to said second arm portion, means for constraining said counterbalancing weight to follow an arcuate path centered about the axis of rotation of said driving element and thereby preventing outward movement of said counterbalancing weight under the action of centrifugal force, and means forming a pin and slot connection between said counterbalancing weight and said second arm portion for transmitting gravity induced forces from said counterbalancing weight to said arm and thereby neutralizing the effect of gravity on said actuating weight means.

5. A self-engaging clutch, comprising driving and driven members, means supporting said members in adjacent relation for independent rotation about a common axis, a clutch element operable to form a driving connection between said members, an actuating lever connected to said clutch element, pivot means swingably mounting said lever on said driving member, actuating weight means fixed on said lever to operate said clutch element by centrifugal action, a counterbalancing weight carried on said driving member and disposed generally opposite from said actuating weight means with respect to said common axis of said members, means on said driving member guiding said counterbalancing weight for movement thereon along an arcuate path centered about said axis while preventing radial movement of said counterbalancing weight under the action of centrifugal force, and connecting means disposed between said counterbalancing weight and said lever for transmitting gravity-induced forces therebetween and thereby neutralizing the effect of gravity on said actuating weight means.

References Cited in the file of this patent
UNITED STATES PATENTS

| 785,496 | Jires | Mar. 21, 1905 |
| 999,016 | Denmead | July 25, 1911 |